US011177511B2

(12) United States Patent
Meier et al.

(10) Patent No.: US 11,177,511 B2
(45) Date of Patent: Nov. 16, 2021

(54) SYSTEM FOR PROCESSING BATTERY PLATES AND ARRANGEMENT THEREOF IN THE PROVIDED BATTERY HOUSING

(71) Applicant: SASIT INDUSTRIETECHNIK GMBH, Zwickau (DE)

(72) Inventors: Jochen Meier, Hartenstein (DE); Andre Friedenberger, Fraureuth (DE)

(73) Assignee: SASIT INDUSTRIETECHNIK GMBH, Zwickau (DE)

( * ) Notice: Subject to any disclaimer, the term of this patent is extended or adjusted under 35 U.S.C. 154(b) by 0 days.

(21) Appl. No.: 15/599,217

(22) Filed: May 18, 2017

(65) Prior Publication Data
US 2017/0256824 A1 Sep. 7, 2017

Related U.S. Application Data

(63) Continuation of application No. 14/357,515, filed as application No. PCT/DE2012/001072 on Nov. 8, 2012, now abandoned.

(30) Foreign Application Priority Data

Nov. 10, 2011 (DE) .................... 10 2011 118 092.7

(51) Int. Cl.
*H01M 10/14* (2006.01)
*H01M 10/04* (2006.01)
*H01M 10/16* (2006.01)

(52) U.S. Cl.
CPC ....... *H01M 10/14* (2013.01); *H01M 10/0404* (2013.01); *H01M 10/16* (2013.01); *Y10T 29/53135* (2015.01)

(58) Field of Classification Search
None
See application file for complete search history.

(56) References Cited

U.S. PATENT DOCUMENTS 3,294,258 A 12/1966 Sabatino et al.
3,744,112 A * 7/1973 Lindenberg ............. H01M 2/28
29/38 B
(Continued)

FOREIGN PATENT DOCUMENTS

AT 8261 4/2006
CN 1395333 2/2003
(Continued)

OTHER PUBLICATIONS

International Search Report for PCT/DE2012/001072, English translation attached to original, Both completed by the European Patent Office dated Mar. 28, 2013, 7 Pages.

*Primary Examiner* — Carmen V Lyles-Irving
(74) *Attorney, Agent, or Firm* — Brooks Kushman P.C.

(57) ABSTRACT

A system for processing battery plates and arrangement thereof in the battery housing, including transportation apparatuses and individual processing stations, such as insertion stations, tin bath, and a lead casting station. The battery plates which are to be processed are arranged as plate stacks in a plurality of clamping cassettes which are equipped with the plate stacks arranged in a vertically oriented transportation apparatus which rotates in a circle. The plate stacks and the individual processing stations rotate in a vertically oriented circular movement and can be supplied to the clamping cassette which is positioned in the processing station.

3 Claims, 7 Drawing Sheets

(56) References Cited

U.S. PATENT DOCUMENTS

| | | | | |
|---|---|---|---|---|
| 3,926,247 | A | * 12/1975 | Geiger | B22D 11/0611 |
| | | | | 164/263 |
| 4,502,213 | A | 3/1985 | Madden et al. | |
| 4,536,385 | A | * 8/1985 | Heubach | B01J 10/005 |
| | | | | 422/109 |
| 4,967,827 | A | * 11/1990 | Campbell | B22D 18/04 |
| | | | | 164/133 |
| 5,044,067 | A | * 9/1991 | Wheadon | H01M 2/0242 |
| | | | | 29/623.1 |
| 6,830,424 | B2 | 12/2004 | Fujino et al. | |
| 8,756,798 | B2 | 6/2014 | Meier et al. | |
| 2001/0041226 | A1* | 11/2001 | Elbern | C23C 2/00 |
| | | | | 427/431 |
| 2007/0266553 | A1 | 11/2007 | Schlogl | |
| 2011/0111301 | A1* | 5/2011 | Rossi | B22D 11/0611 |
| | | | | 429/225 |
| 2012/0240394 | A1* | 9/2012 | Meier | B23P 21/006 |
| | | | | 29/787 |
| 2013/0125388 | A1 | 5/2013 | Loer | |

FOREIGN PATENT DOCUMENTS

| | | |
|---|---|---|
| CN | 2886822 | 4/2007 |
| CN | 201540926 | 8/2010 |
| DE | 202009011262 | 12/2009 |
| DE | 102010033436 | 2/2012 |
| EP | 0397640 | 11/1990 |
| KR | 20010099162 | 11/2001 |

* cited by examiner

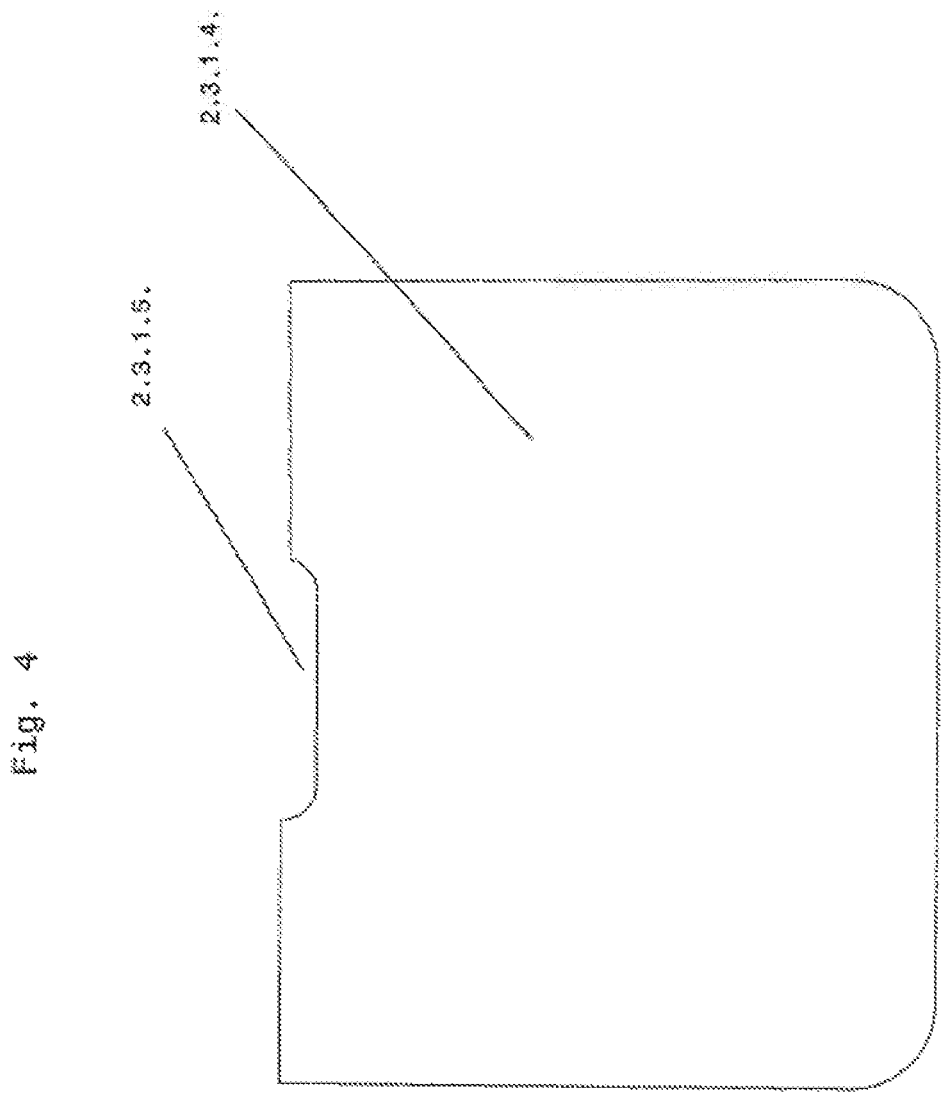

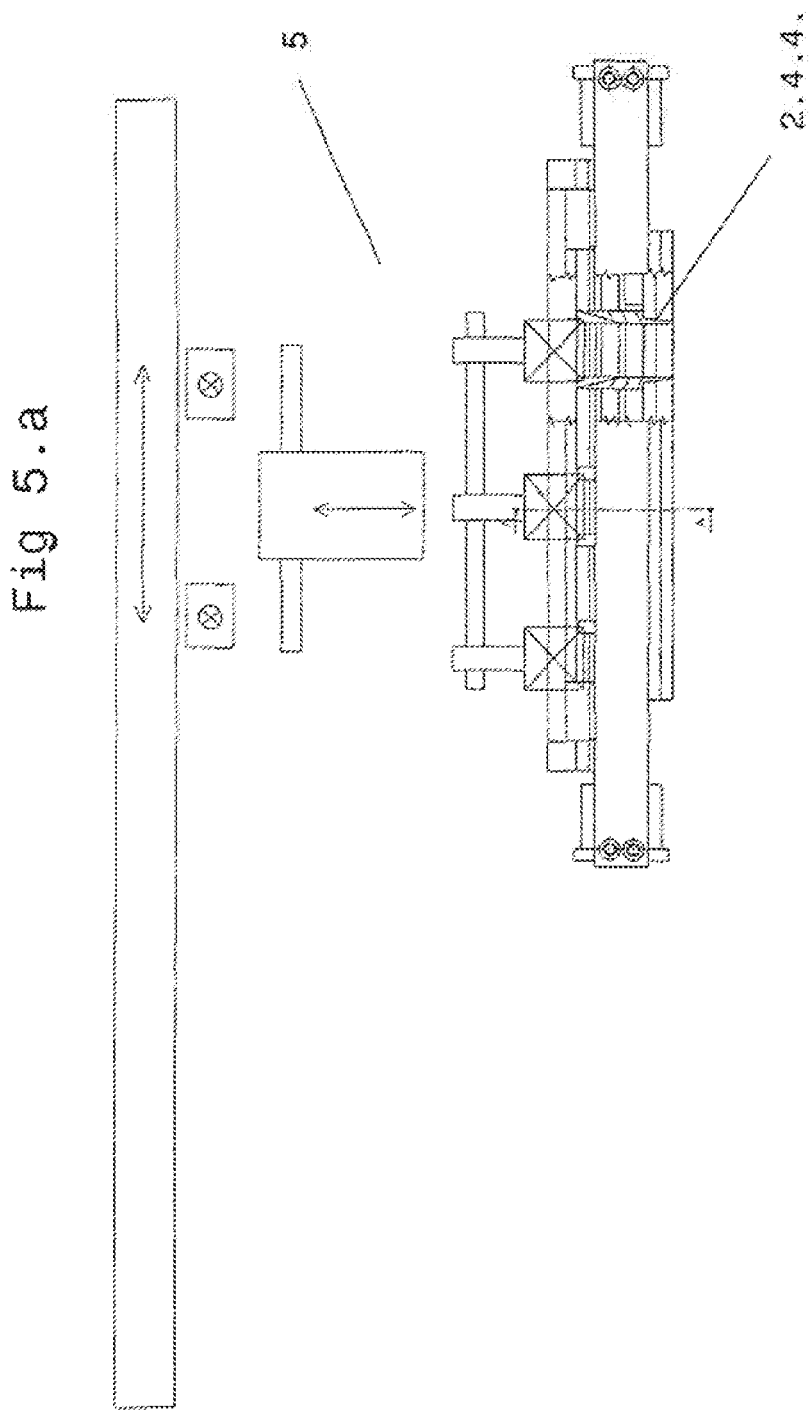

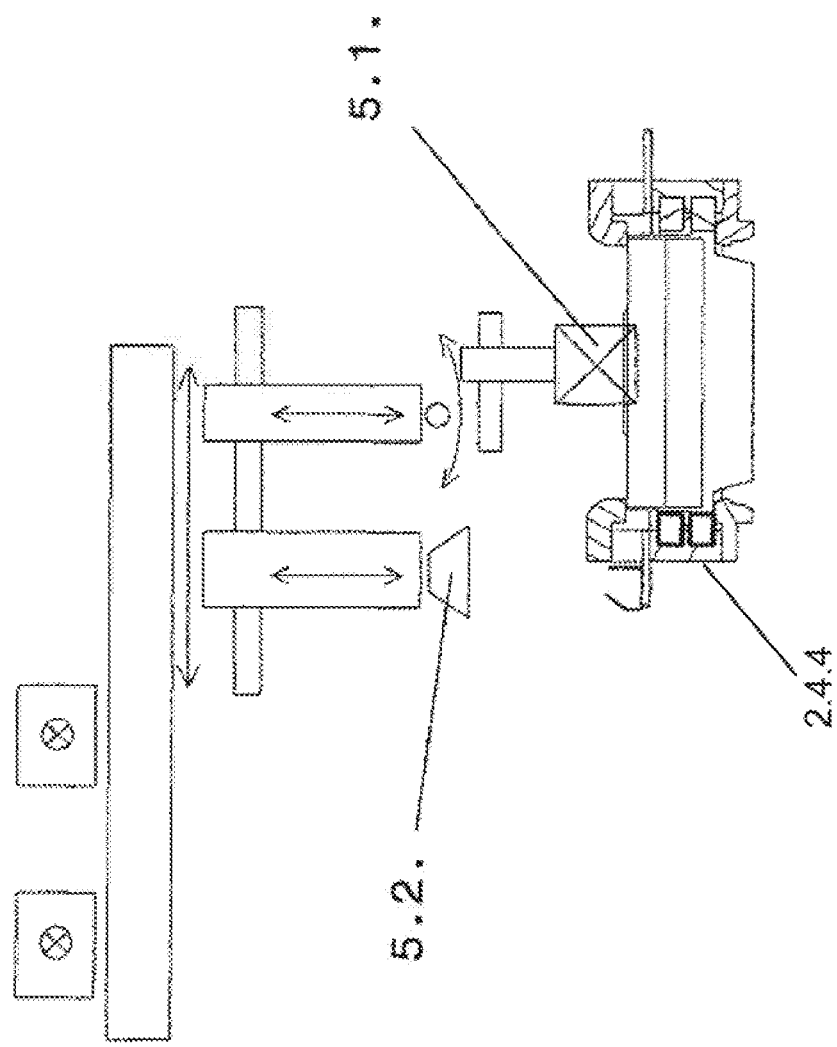

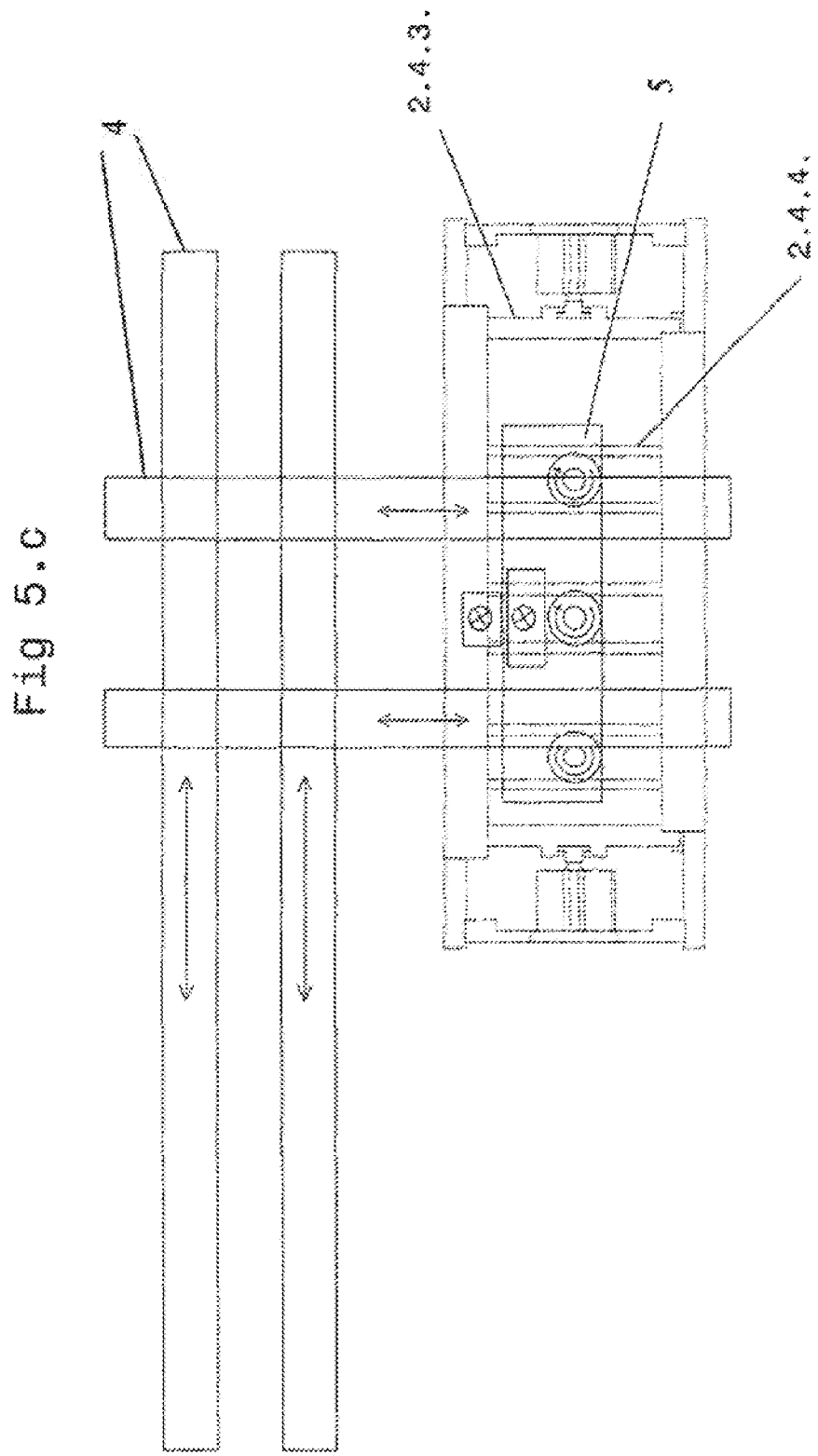

SYSTEM FOR PROCESSING BATTERY PLATES AND ARRANGEMENT THEREOF IN THE PROVIDED BATTERY HOUSING

CROSS-REFERENCE TO RELATED APPLICATIONS

This application is a continuation of U.S. application Ser. No. 14/357,515 filed May 9, 2014, which is the U.S. national phase of PCT Application No. PCT/DE2012/001072 filed on Nov. 8, 2012, which claims priority to German Patent Application No. 10 2011 118 092.7 filed on Nov. 10, 2011, the disclosures of which are incorporated in their entirety by reference herein.

TECHNICAL FIELD

The invention relates to a system for processing battery plates and arrangement of them in the battery housing provided therefor. The system consists of transporting devices and individual processing stations, the battery plates to be processed being arranged for the processing as plate stacks in clamping cassettes. The invention is used in the production of motor 15 vehicle and commercial-vehicle batteries.

BACKGROUND

For the production of motor-vehicle batteries, it is necessary to arrange a multiplicity of electrode plates into individual battery cells that are arranged separately from one another in the battery housing. In this case, the electrode plates are combined in individual stacks and are assigned to the battery cells. A device for connecting individual battery plates to form stacks and for inserting the stacks into battery cases is described in AT 008 261 U1. The individual necessary processing steps are carried out in a total of 14 processing stations, which are arranged one after the other. This results in an immense space requirement for setting up such a system and an immense transporting requirement during production.

A further system for fitting out and loading battery cases with plate stacks is described in DE 202009011262 U1. This solution shows that individual processing stations are arranged around a lifting-turning table as a compact station and the clamping cassettes that are provided with the plates to be processed are fed from the lifting-turning table to the individual transporting stations within the compact station. Since the processing stations are arranged in this compact station in a permanently integrated manner, access to these stations is not possible during production. As a result, if there is a need for maintenance, separate maintenance work is required. Furthermore, the clamping cassette is turned in the processing station, which requires a separate additional cycle. This prolongs the time for the processing of the plates and the loading of the battery housing. On account of the arrangement of the compact station with the lifting-turning table and the processing stations in a horizontal plane, the space requirement for setting up such a system is very great.

SUMMARY

The object of the invention is to find a technical solution with which the drawbacks of the prior art can be overcome. The inventive solution is intended to be distinguished by a low space requirement. With the reduction of the cycle times, it is intended that the production times and production costs are lowered. Suitable inspection and monitoring systems are intended to contribute to the optimized quality assurance of the production of the battery plates and the arrangement of them in the battery housing.

For necessary maintenance work on the processing stations, it is intended that the stations are of an easy-maintenance design, so that no significant downtimes of the system or additional processing times have to be taken up for this work either.

According to the invention, the object is achieved by the features of claim 1. The advantageous refinements are described in the subclaims.

Accordingly, the system for processing battery plates and arrangement of them in battery housings consists of a transporting device and individual processing stations, the battery plates to be processed being arranged for the processing as plate stacks in clamping cassettes. The clamping cassettes provided with the plate stacks are arranged in a transporting device that is vertically aligned and in this position performs a circular turning movement, so that the movement of the clamping cassettes takes place as in the case of a giant wheel.

This offers the advantage that there is a very low space requirement for the transporting device. Furthermore, it offers the advantage that the individual processing stations are arranged from all spatial planes, as above, below and laterally outside the vertically aligned transporting device, it being possible for them to be moved from there up to and away from the positioned clamping cassette.

The fact that the processing stations can be moved away out of the processing area at the same time provides an efficient solution for the maintenance of the processing stations. They can be maintained in a user friendly and time-saving way.

Provided as processing stations are an insertion box, with at least a sixfold gripper system, for the assignment of the battery plate stacks into the clamping cassette, and also an aligning device and clamping device for the battery plate stacks into the clamping cassette provided by the transporting device, a flux station, with a drying unit and tin bath, a casting station for casting on the lead bridges, with a lead bath, and a boxing station for boxing the completely fitted out battery plate stacks into the battery cases provided, with at least a sixfold gripper system.

The insertion box advantageously has at least a sixfold gripper system for inserting the completely dimensioned plate stacks from a storage buffer into the clamping cassette 3, in order to make effective provision of the clamping cassette with the plate stacks efficiently possible.

The tin bath of the flux station is in this case advantageously fitted out with a measuring system for the permanent measuring of the tin bath level. This measuring system passes on the measured value information to the tin wire feed, so that the tin bath level is always kept at a constant level. The measurement may in practice be carried out as eddy current measurement. This measure essentially supports the constant keeping of a necessary tin bath level, in order to avoid sources of error during the processing continuously and effectively.

The casting station serves for the casting on of the lead bridges and therefore has a melting vessel divided by a separating wall into two compartments, the molten lead and the feeding in of lead bars for the melt being provided in one half of the vessel while the other half of the vessel serves as a settling compartment, from which the molten lead is transferred by means of a pump into the immersion compartment for the casting on of the lead bridges.

To obtain a constant level in the settling compartment of the melting vessel, the molten lead is pumped into the settling compartment from the other compartment by means of a constantly running pump. In addition, at least one overflow bead, which additionally regulates the level of the molten lead in the settling compartment of the melting vessel, is arranged in the separating wall between the settling compartment and the compartment for feeding lead to the melting vessel. This measure also serves for permanently ensuring, constantly and efficiently, a casting quality in the casting on of the lead bridges during the production process.

In the boxing station for boxing the completely fitted out battery plate stacks into the battery cases provided there is arranged at least one cleaning device which serves for the cleaning of the boxing frames. This cleaning device has a brush and/or spray system, which enters the provided boxing frames by means of a multi-axis system before the loading with the battery plate stacks and carries out there the cleaning and removal of dirt particles and deposits. This prevents dirt particles from being able to become attached to the plate stacks during the boxing, which performs the boxing with little freedom of space.

This measure also serves for achieving a high quality standard in the loading of completely prepared battery stacks into prepared battery cases.

In order to increase the effectiveness of the system, arranged at the boxing station is at least a threefold gripper system, which removes the completely prepared plate stacks from the clamping cassettes, to be precise three stacks at the same time. After that, the plate stacks are boxed in the battery cases. During the transfer, the battery case is turned, so that the next 3 stacks can be inserted into the battery case. Advantageously, a number of threefold gripper systems are arranged.

The vertically aligned and circularly turning transporting device has at least one separate turning device for the clamping cassettes, which serves for turning the clamping cassettes during the transport to the next processing station. As a time-saving feature, the correct positioning of the clamping cassette for the next processing operation is performed during the transport to this station, so that no necessary additional expenditure of time is required for this.

In order to guide the individual processing stations to the transporting device from the outside, each processing station has if need be a separate transporting device of its own, serving for moving back and forth in relation to the transporting device.

The advantages of this technical solution for the processing of battery stacks and arrangement of them in the battery housings provided for this purpose are, in particular, the possibility of a space-saving construction of this system with a high degree of continuity of the sequences in the individual processing stages combined with continuous monitoring to maintain quality criteria and to avoid error points within the production process.

By bringing the individual processing stages out of the transporting process, the maintenance work can be partly carried out without any loss of cycle time by provided replacement modules with quick-changing devices.

The invention is to be explained in more detail below on the basis of an exemplary embodiment.

BRIEF DESCRIPTION OF THE DRAWINGS

FIG. 4 shows a side view of a separating wall (2.3.1.4) with overflow bead.

FIG. 5a shows a schematic side view of the cleaning device (5) for the boxing frames (2.4.3) with their spreaders (2.4.4).

FIG. 5b shows a schematic side view of the cleaning device (5) in the form of a detail.

FIG. 5c shows a schematic plan view of the boxing station 2.4 with the cleaning system 5 for the boxing frames (2.4.3) and spreaders (2.4.4).

DETAILED DESCRIPTION

Figure 1:
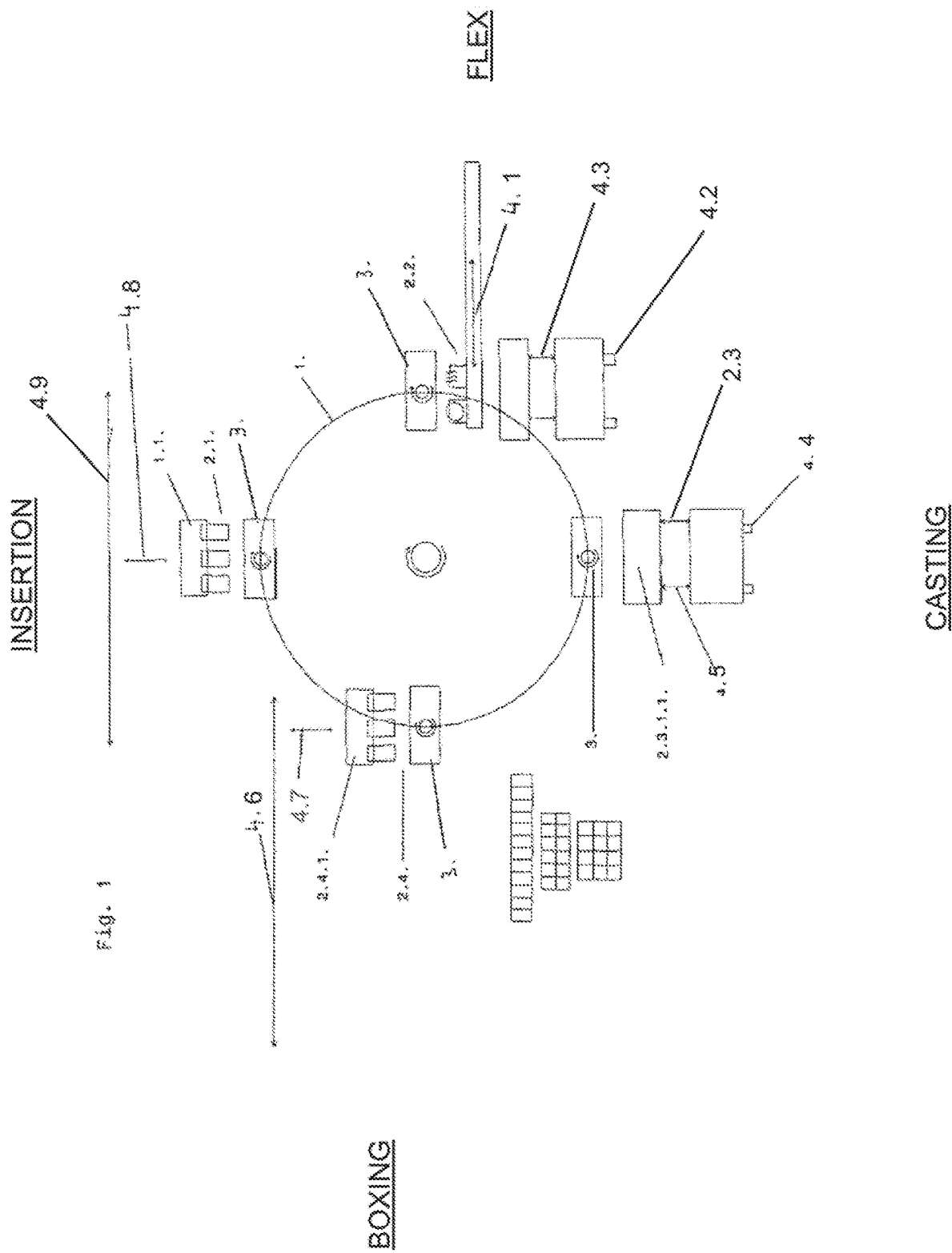
FIG. 1 shows a schematic representation of a system for processing battery plates and arrangement of them in the battery housings provided for this purpose.
Figure 2:
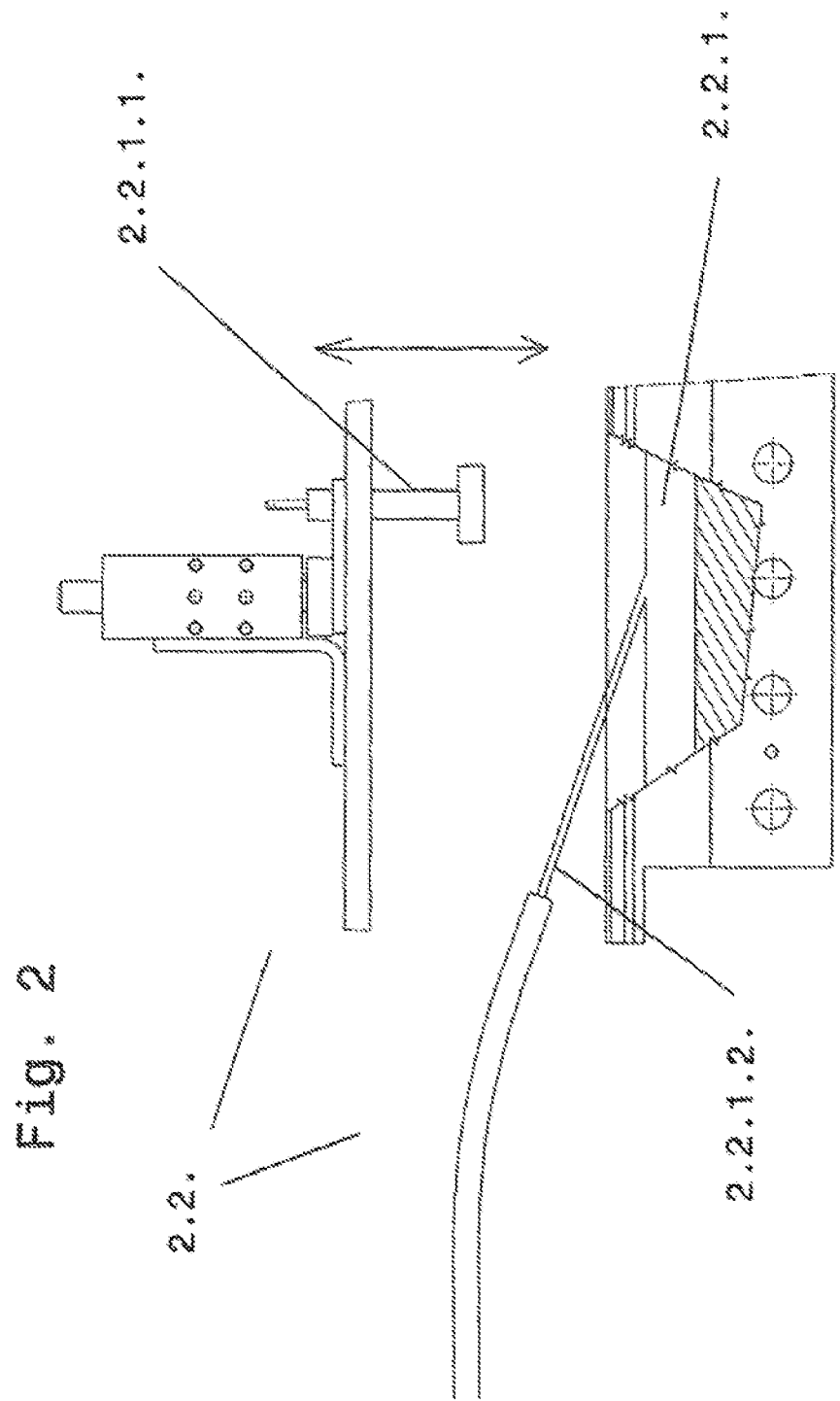
FIG. 2 shows a schematic representation of the flux station with tin bath, tin wire feed and tin level measuring system.
Figure 3:
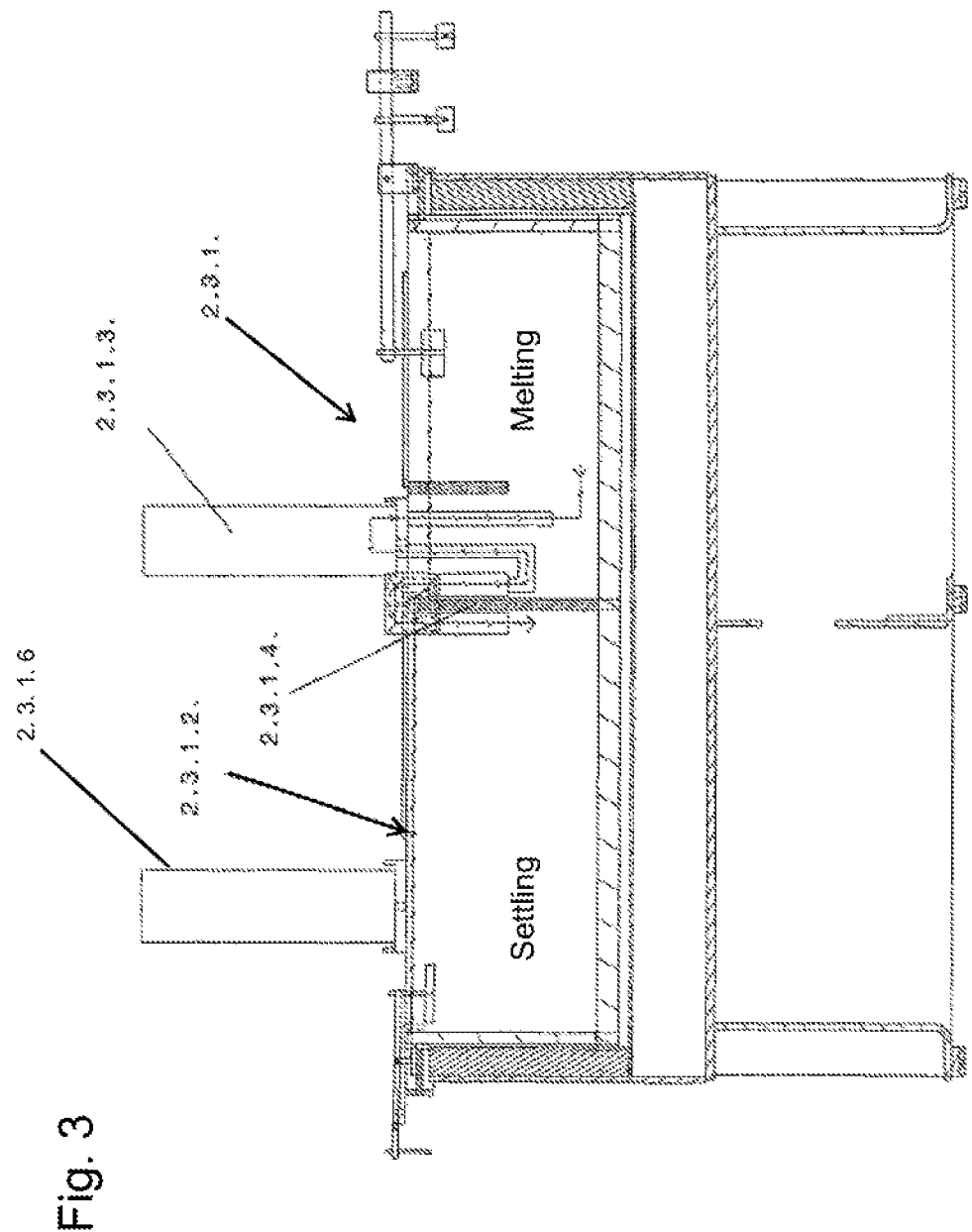
FIG. 3 shows a schematic representation of the lead bath (2.3.1) with the two compartments (2.3.1.3) divided by wall (2.3.1.4) forming a melting vessel and a settling compartment.

According to FIGS. 1 to 5c, a system for processing battery plates and for arranging these battery plates in battery housings provided for this purpose consists of transporting devices and individual processing stations, such as an insertion stations, the tin bath, the lead casting station. The battery plates to be processed are in this case arranged for the processing as defined plate stacks in a number of clamping cassettes provided for this purpose. According to the invention, these clamping cassettes provided with plate stacks are arranged in a transporting device 1 performing a vertical turning movement. The individual processing stations 2.1-2.n are arranged in relation to this transporting device 1 peripherally, but outside the circle of movement of the transporting device 1. From there, the processing stations 2.1-2.n are arranged such that they can be respectively brought up to the position of the clamping cassette 3 positioned by the transporting device 1 by means of separate transporting devices 4.1-4.9. Thus, the first processing station, the insertion box 2.1, comprises at least a sixfold gripper system for assigning the plate stacks from a storage buffer into the clamping cassette 3, an aligning device for aligning and for bending the plate lugs and a clamping device for clamping the plate stacks for the insertion into the clamping cassette 3 provided by the transporting device 1.

By vertical turning of the transporting device 1, the clamping cassette 3 provided with plate stacks arrives at the position of the second processing station, the flux station 2.2. By means of a horizontal slide as a separate transporting device 4.1 of the flux station 2.2, the latter is taken with the arranged tin bath 2.2.1 and the integrated measuring system 2.2.1.1, which operates as an eddy current measuring process, for the continuous measurement of the tin bath level, and the tin bath feed 2.2.1.2 to the clamping cassette 3. For optimally regulating the tin bath level, the measuring system 2.2.1.1 and the tin bath feeds 2.2.1.2 are coupled to one another in terms of information technology. Both the tin bath 2.2.1 and the additionally arranged drying device can in this case be brought up vertically to the transporting device 1 by means of the separate transporting device 4. In addition, the tin bath 2.2.1 can be brought up in a vertical direction to the clamping cassette 3. Before entering, the latter is turned as it travels downward, and can enter thus the tin bath 2.2.1 brought up from below. After the drying, the clamping cassette is transported by the transporting device to the processing station 3 as a result of the vertical turning movement.

In the casting station 2.3, the casting on of the lead bridges is performed. For this purpose, the casting station 2.3 has a lead bath 2.3.1 with a melting vessel 2.3.1.2. The melting vessel 2.3.1.2 is in turn divided by a separating wall 2.3.1.4 into two part-compartments. In the one vessel half, the feeding in of lead bars for the molten lead is performed. In the other vessel half, the settling of the molten lead is performed. The lead is constantly pumped from the one vessel half into the settling compartment of the melting vessel 2.3.1.2 by means of a first pump 2.3.1.3. At least one overflow bead 2.3.1.5, which additionally regulates the level of the molten lead in the settling compartment of the melting vessel by a permanent overflow, since the surfaces of the levels of lead in the two compartments of the melting vessel 2.3.1.2 are at different heights, is arranged in the separating wall 2.3.1.4 between the settling compartment and the compartment for feeding lead to the melting vessel 2.3.1.1.

From the settling compartment of the melting vessel 2.3.1.2, the molten lead, of very good quality, passes by means of a second pump 2.3.1.6 into a casting mold 2.3.1.1, where the casting on of the lead bridges is performed. For this purpose, the casting station 2.3 has an additional vertical transporting device 4 for bringing the casting mold 2.3.1.1 up to the clamping cassette 3. An additional horizontal displacing device as transporting device 4 provides the possibility of exchanging the entire casting mold 2.3.1.1 for maintenance and/or repair work, so that the processing sequence of the transporting device does not have to be interrupted.

After the casting on of the bridges of lead, the clamping cassette 3 is transported by means of the transporting device 1, by vertical turning thereof, to the position of the boxing station 2.4 for the boxing of the completely fitted-out battery plate stacks into the provided battery cases.

For this purpose, the boxing station 2.4 has at least a threefold gripper system 2.4.1 and a cleaning device 5 which serves for the cleaning of the boxing frames 5.1. This cleaning device serves for cleaning the spreaders 2.4.4, of the boxing frames 2.4.3, which become contaminated by the constant use. The cleaning station 5 has a brush 5.1 and/or spray system 5.2, which enters the provided boxing frames by means of a multi-axis system before the loading with the battery plate stacks and performs and reliably carries out there the cleaning and removal of dirt particles and deposits in 3D directions.

The advantages of the present invention are summarized in a technical solution for the processing and arrangement of battery plates in provided battery housings that is distinguished by a low space requirement, has a high degree of monitoring functions and quality assurance measures for the processing sequences in the individual processing stations, operates efficiently and, as a result of the assignment of additional transporting devices to the individual processing stations, reduces the time expenditure for repair and maintenance tasks enormously. In particular, the measures for improving the quality assurance contribute to permanently and reliably inspecting and controlling all of the processing steps for the production and loading of the battery plate stacks, so that the system delivers a high degree of high-quality and completely loaded battery cases.

LIST OF DESIGNATIONS

1 Transporting device for clamping cassettes
2.1-2.n Processing stations
2.1 Insertion box
2.1.1 Sixfold gripper system
2.2 Flux station
2.2.1 Tin bath
2.2.1.1 Measuring system for tin level
2.2.1.2 Tin wire feed
2.3 Casting station
2.3.1 Lead bath
2.3.1.1 Casting mold
2.3.1.2 Melting vessel
2.3.1.3 Pump
2.3.1.4 Separating wall
2.3.1.5 Overflow bead
2.4 Boxing station
2.4.1 Threefold gripper
2.4.3 Boxing frame
2.4.4 Spreaders
3 Clamping cassettes
4 Separate transporting devices of the processing stations
5 Cleaning device
5.1 Brush system
5.2 Spray system

What is claimed is:

1. A system for processing battery plates comprising:
a rotary transport device that is rotatable about a horizontal axis and is vertically aligned performing a rotary movement in a vertical plane; and
a plurality of spaced apart individual processing stations disposed about the rotary transport device, the individual processing stations comprising:
an insertion station,
a flux station,
a lead casting station, and
a boxing station in which the battery plates are installed in battery cases,
wherein, the battery plates to be processed are arranged on the rotary transport device and spaced from the horizontal axis to rotate in a circular manner for processing in disk stacks in a designated number of clamping cassettes,
wherein clamping cassettes provided with the disk stacks are arranged on the rotary transport device spaced from the horizontal axis to rotate in a circular manner,
the plurality of spaced apart individual processing stations for positioning the individual processing stations are arranged in the position of the clamping cassettes above, below or radially outside of the rotary transport device,
the flux station further comprises a drying apparatus, a tin bath, and a tin level measuring system,
wherein the lead casting station has a melting vessel divided into two chambers by a partition wall, forming a lead casting chamber and a lead settling chamber,
on the melting vessel a continuously running pump is arranged, which continuously pumps molten lead from the lead casting chamber of the melting vessel into the lead settling chamber of the melting vessel to reach a constant level and further thereto on the partition wall between the lead casting chamber and the lead settling chamber of the melting vessel, at least one overflow bead is arranged, which additionally regulates the level of molten lead in the lead settling chamber of the melting vessel, and
a further pump is arranged on the lead settling chamber, which transfers the molten lead from the lead settling chamber of the melting vessel into a casting mold.

2. The system as claimed in claim 1, wherein the tin level measuring system, comprises an eddy current measuring system.

3. The system as claimed in claim 1, wherein each processing station has a separate transporting device of its own, serving for moving back and forth in relation to the rotary transport device.

\* \* \* \* \*